United States Patent
Agapiou et al.

(10) Patent No.: US 10,164,508 B2
(45) Date of Patent: *Dec. 25, 2018

(54) LAMINATION PACK AND METHOD OF FORMING SAME

(71) Applicant: GM GLOBAL TECHNOLOGY OPERATIONS LLC, Detroit, MI (US)

(72) Inventors: John S. Agapiou, Rochester Hills, MI (US); Michael D. Hanna, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 74 days.

This patent is subject to a terminal disclaimer.

(21) Appl. No.: 15/439,009

(22) Filed: Feb. 22, 2017

(65) Prior Publication Data

US 2017/0163136 A1    Jun. 8, 2017

Related U.S. Application Data

(63) Continuation of application No. 14/591,035, filed on Jan. 7, 2015, now Pat. No. 9,621,012.

(51) Int. Cl.
*H02K 17/16* (2006.01)
*H02K 15/00* (2006.01)

(52) U.S. Cl.
CPC ....... *H02K 17/165* (2013.01); *H02K 15/0012* (2013.01)

(58) Field of Classification Search
CPC ........ H02K 1/26; H02K 17/16; H02K 17/165; H02K 17/18; H02K 17/20; H02K 15/00; H02K 15/0012; H02K 15/02; H02K 15/10; H02K 19/02; H02K 19/06; B22D 19/0054
See application file for complete search history.

(56) References Cited

U.S. PATENT DOCUMENTS

| | | | | |
|---|---|---|---|---|
| 2,333,200 | A * | 11/1943 | Roe | H02K 17/165 29/598 |
| 3,685,142 | A * | 8/1972 | Deming | H02K 17/10 29/598 |
| 5,778,512 | A * | 7/1998 | Ichikawa | H02K 15/0414 29/598 |
| 6,727,624 | B2 * | 4/2004 | Morita | H02K 1/276 310/156.78 |

(Continued)

*Primary Examiner* — Tran Nguyen
(74) *Attorney, Agent, or Firm* — Quinn IP Law

(57) ABSTRACT

A lamination pack for a motor and method of forming the lamination pack is provided. The method includes inserting a plurality of conductor bars into a plurality of rotor slots defined by a lamination stack such that opposing bar ends of the conductor bars extend from opposing end faces of the lamination stack, skewing the lamination stack and the conductor bars to a skew angle relative to a rotation axis of the lamination stack, and subsequently bending the bar ends of the conductor bars in opposing radial directions to a locking angle greater than the skew angle, to lock each of the conductor bars in its respective rotor slot. The bent bar ends exert a compressive axial locking force on the lamination stack to prevent axial and radial movement of the laminations in the lamination stack and to prevent axial movement of the conductor bars relative to the lamination stack.

20 Claims, 4 Drawing Sheets

(56) References Cited

U.S. PATENT DOCUMENTS

| | | | | |
|---|---|---|---|---|
| 6,737,783 B2* | 5/2004 | Yanashima | ............ | H02K 21/46 |
| | | | | 310/179 |
| 7,302,750 B2* | 12/2007 | Niimi | ................ | H02K 3/12 |
| | | | | 29/596 |
| 7,459,815 B2* | 12/2008 | Han | ................ | H02K 7/125 |
| | | | | 310/114 |
| 9,621,012 B2* | 4/2017 | Agapiou | ............ | H02K 15/0012 |
| 2006/0192457 A1* | 8/2006 | Nakayama | ............ | H02K 17/16 |
| | | | | 310/211 |

* cited by examiner

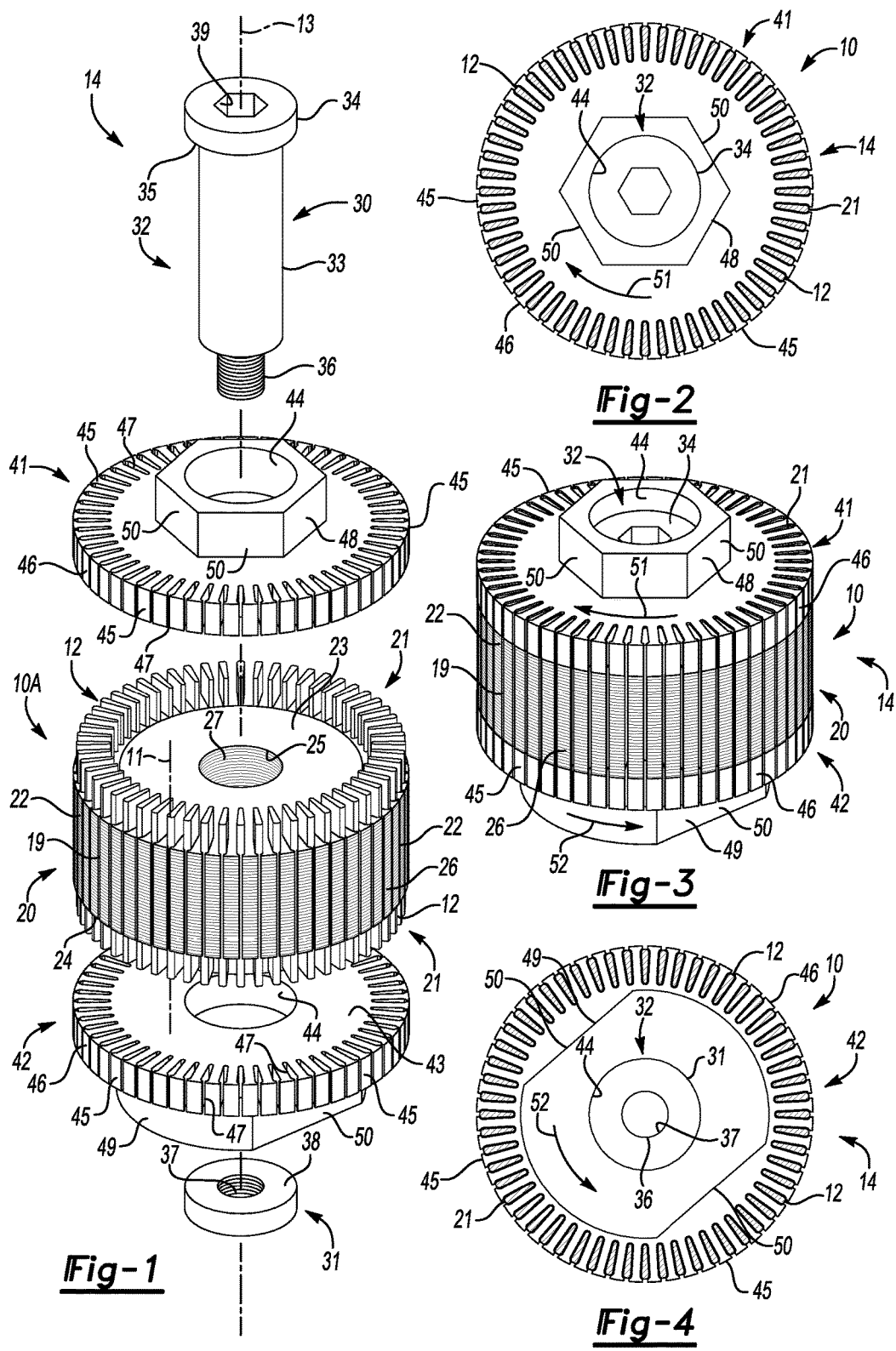

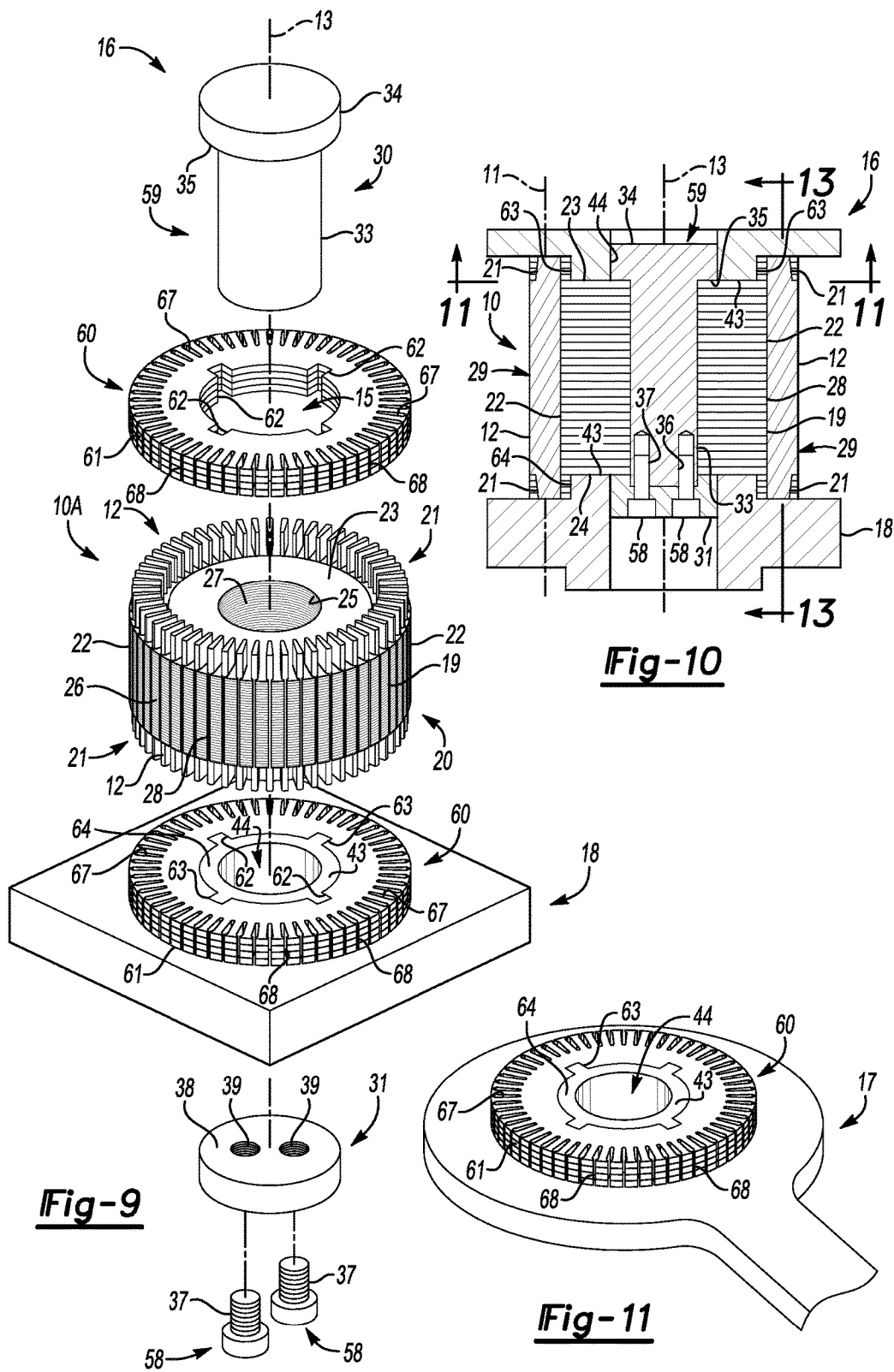

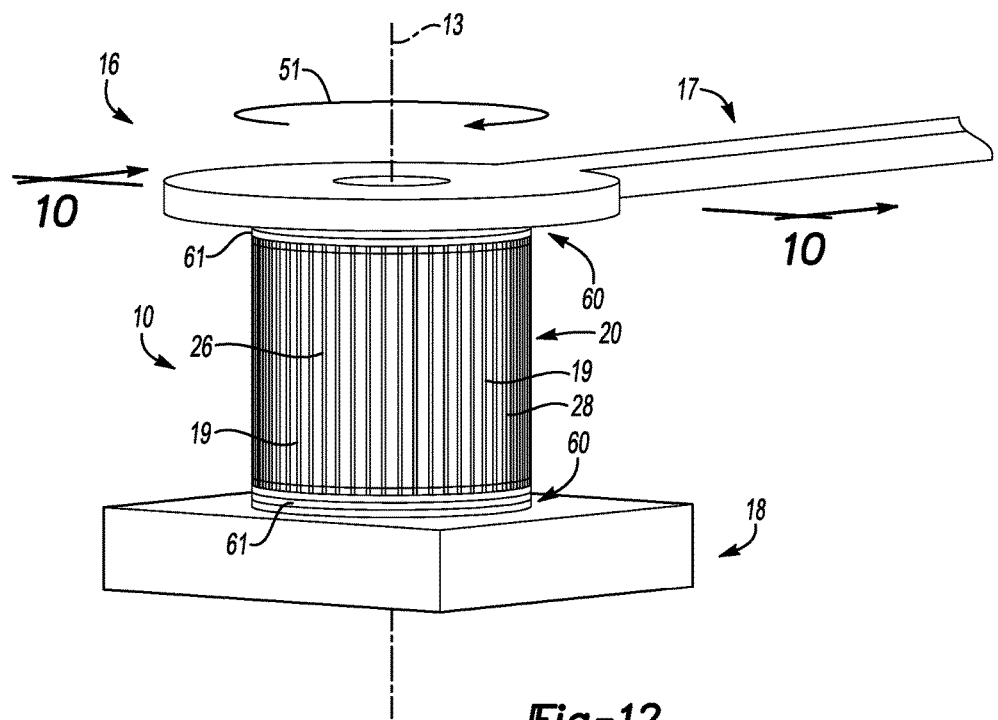
*Fig-12*
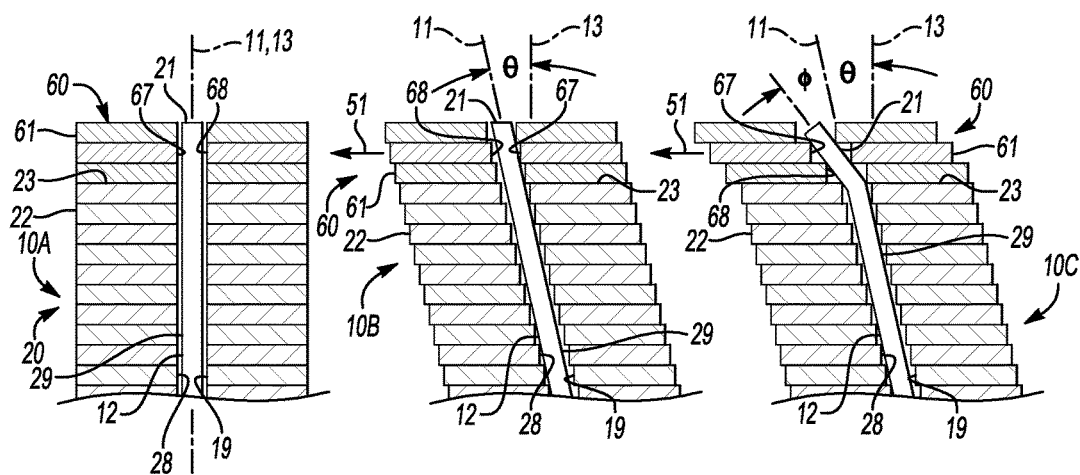
*Fig-13A*   *Fig-13B*   *Fig-13C*

LAMINATION PACK AND METHOD OF FORMING SAME

CROSS-REFERENCE TO RELATED APPLICATIONS

This application claims the benefit of U.S. Non-provisional application Ser. No. 14/591,035 filed on Jan. 7, 2015, which is hereby incorporated by reference in its entirety.

TECHNICAL FIELD

The disclosure relates to a lamination pack of a rotor, and a method of forming a lamination pack of a rotor.

BACKGROUND

Electromagnetic machines such as electric motors, generators, and traction motors are useful for converting energy from one form to another. Such electromagnetic machines often include an element such as a rotor which is rotatable about an axis. The rotatable element or rotor may be coaxial with a static element or stator, and energy may be converted via relative rotation between the rotor and the stator.

One type of electromagnetic machine, an alternating current induction motor, uses induced current flow to magnetize portions of the rotor during motor operation. More specifically, induced current may flow through conductor bars disposed nearly parallel to the axis along a periphery of the rotor in a skewed configuration. The conductor bars are skewed relative to the axis along the periphery to reduce magnetic locking or cogging between the stator and rotor, to reduce magnetic humming noise during running condition, and to achieve uniform torque. Each conductor bar may be electrically connected to every other conductor bar and/or by shorting elements disposed at opposite ends of the rotor. The shorting elements and conductor bars are subject to inertial forces during rotor operation.

SUMMARY

A method of forming a lamination pack of a rotor includes inserting a plurality of conductor bars into a plurality of rotor slots defined by a lamination stack such that opposing bar ends of the conductor bars extend axially from opposing end faces of the lamination stack, and skewing the lamination stack and the conductor bars to a skew angle relative to a rotation axis of the lamination stack, also referred to herein as the rotation axis of the lamination stack, to form a skewed lamination pack. A retaining force is applied to the skewed lamination pack to compress the laminations against each other, to prevent further radial rotation of each lamination relative to each other lamination in the clamped skewed pack while exerting a bending force on the bar ends extending the opposing end faces of the skewed pack. While the lamination pack is clamped by the retaining force, the bending force is applied to the bar ends to bend the respective bar ends of the conductor bars extending from the respective end faces of the skewed pack in opposing radial directions, where the bar ends are bent to a locking angle which is greater than the skew angle, relative to the rotation axis of the lamination pack, to lock each of the conductor bars in its respective rotor slot to prevent axial movement of the conductor bar relative to the lamination stack and such that the bent bar ends exert a compressive axial locking force on the lamination stack which prevents axial and radial movement of the laminations in the locked and skewed lamination stack. Bending the bar ends to lock the bar ends of the conductor bars to the skewed lamination stack creates a lamination pack which is advantaged by the prevailing compressive axial force exerted and maintained by the bent bar ends compressing the lamination stack such that the lamination pack resists high frequency vibration of the conductor bars in the stack during operation of the rotor in a motor and maintains the density of the stack at a predetermined packing ratio to deliver consistent power density over time and resists cogging.

The method of forming a lamination pack includes providing a lamination stack to an apparatus configured to form the lamination pack. The lamination stack defines a proximal face and a distal face spaced apart from the proximal face and further defines a longitudinal axis. The lamination stack includes a plurality of laminations aligned radially relative to the longitudinal axis such that the plurality of laminations defines a plurality of slots extending from the proximal face to the distal face and distributed radially about a periphery of the lamination stack, and further includes a plurality of conductor bars. Each conductor bar includes first and second bar ends and an intermediate portion intermediate the first and second bar ends. The intermediate portion of each conductor bar is disposed within a respective one of the plurality of slots such that the first bar end extends from the proximal face and the second bar end extends from the distal face. The method includes skewing the lamination stack including the conductor bars such that each of the plurality of conductor bars is skewed relative to the longitudinal axis by a skew angle, then exerting a retaining force on the skewed lamination stack, where the retaining force is sufficient to prevent axial movement and prevent radial rotation of each lamination relative to each other lamination in the skewed lamination stack. The method continues with bending the first bar ends in a first radial direction to a bend angle relative to the intermediate portion of the conductor bar and bending the second bar ends in a second radial direction to the bend angle relative to the intermediate portion of the conductor bar, where the first radial direction opposes the second radial direction. The retaining force is exerted on the lamination stack after skewing the lamination stack and is maintained during bending of the first and second bar ends. After bending, the first and second bar ends exert a locking force on the lamination stack such that axial and radial movement of each lamination relative to each other lamination of the plurality of laminations is prevented.

In one example, the method includes positioning a first rotation plate defining a plurality of plate slots adjacent the proximal face, such that the first bar end of each of the plurality of conductor bars is received into a respective one of the plate slots of the first rotation plate, and positioning a second rotation plate defining a plurality of plate slots adjacent the distal face, such that the second bar end of each of the plurality of conductor bars is received into a respective one of the plate slots of the second rotation plate. Each of the plate slots is defined by opposing support and contoured faces, where the contoured face includes a skew face defining the skew angle and a bend face defining the bend angle. In this example, skewing the lamination stack includes rotating at least one of the first and second rotation plates by a first amount to exert a skewing force on the first and second bar ends via the interface between the first and second bar ends and the plate slots prior to exerting the retaining force, and bending the first and second bar ends includes rotating at least one of the first and second rotation plates by a second amount to exert a bending force on the first and second bar ends. The second amount of rotation is incremental to the first amount of rotation and the retaining force is maintained during rotation of the at least one of the first and second rotation plates by the second amount.

In another example, the method includes positioning a first shorting ring defining a plurality of ring slots adjacent the proximal face, such that the first bar end of each of the plurality of conductor bars is received into a respective one of the ring slots of the first shorting ring, and positioning a second shorting ring defining a plurality of ring slots adjacent the distal face, such that the second bar end of each of the plurality of conductor bars is received into a respective one of the ring slots of the second shorting ring. In this example, skewing the lamination stack prior to exerting the retaining force includes skewing the first shorting ring to the skew angle in the first radial direction and skewing the second shorting ring to the skew angle in the second radial direction, where skewing the first and second shorting rings to the skew angle exerts a skewing force on the first and second bar ends via the interface between the first and second bar ends and the ring slots. Bending the first and second bar ends, in this example, includes incrementally skewing the first shorting ring to a locking angle in the first radial direction and incrementally skewing the second shorting ring to a locking angle in the second radial direction, where the locking angle is equal to the sum of the skew angle and the bend angle. Incrementally skewing the first and second shorting rings to the locking angle exerts a bending force on the first and second bar ends via the interface between the first and second bar ends and the ring slots. The retaining force is maintained during incremental skewing of the first and second shorting rings from the skew angle to the locking angle. Each of the first and second shorting rings comprises a plurality of shorting sheets, such that after bending, the first and second bar ends exert a locking force on the shorting sheets such that axial and radial movement of each shorting sheet relative to each other shorting sheet of the plurality of shorting sheets is prevented. The shorting sheets are made of an electrically conductive material, such that after bending, the shorting sheets in contact with the bent first and second ends of the conductor bars electrically connect the conductor bars of the lamination pack to form a rotor.

As used herein, the terms "a," "an," "the," "at least one," and "one or more" are interchangeable and indicate that at least one of an item is present. A plurality of such items may be present unless the context clearly indicates otherwise. All numerical values of parameters, quantities, or conditions in this disclosure, including the appended claims, are to be understood as being modified in all instances by the term "about" or "approximately" whether or not "about" or "approximately" actually appears before the numerical value. "About" and "approximately" indicate that the stated numerical value allows some slight imprecision (e.g., with some approach to exactness in the value; reasonably close to the value; nearly; essentially). If the imprecision provided by "about" or "approximately" is not otherwise understood with this meaning, then "about" and "approximately" as used herein indicate at least variations that may arise from methods of measuring and using such parameters. Further, the terminology "substantially" also refers to a slight imprecision of a condition (e.g., with some approach to exactness of the condition; approximately or reasonably close to the condition; nearly; essentially). In addition, disclosed numerical ranges include disclosure of all values and further divided ranges within the entire range. Each value within a range and the endpoints of a range are all disclosed as separate embodiments. The terms "comprising," "includes," "including," "has," and "having" are inclusive and therefore specify the presence of stated items, but do not preclude the presence of other items. As used in this disclosure, the term "or" includes any and all combinations of one or more of the listed items.

The above features and advantages and other features and advantages of the present disclosure will be readily apparent from the following detailed description of the preferred embodiments and best modes for carrying out the present disclosure when taken in connection with the accompanying drawings and appended claims.

BRIEF DESCRIPTION OF THE DRAWINGS

FIG. 1 is a schematic illustration of an exploded perspective view of a first apparatus for forming a lamination pack, showing the first apparatus including first and second plates and a lamination pack including a lamination stack and plurality of conductor bars;

FIG. 2 is a top view of the apparatus of FIG. 1;

FIG. 3 is a side perspective view of the apparatus of FIG. 1 showing the lamination pack prior to skewing the lamination stack and conductor bars;

FIG. 4 is a bottom view of the apparatus of FIG. 1;

FIG. 9 is a schematic illustration of an exploded perspective view of a second apparatus for forming a lamination pack including a lamination stack, a plurality of conductor bars and shorting rings, the apparatus shown in a side perspective view in FIG. 12 further including a rotating tool;

FIG. 10 is a cross-sectional view of section 10-10 of the apparatus of FIG. 12;

FIG. 11 is a partial bottom perspective view of the rotating tool of the apparatus of FIG. 10 including one of the shorting rings of the lamination pack of FIG. 9;

FIG. 12 is a side perspective view of the apparatus of FIG. 9 including the rotating tool of FIG. 11;

FIG. 13A is a partial cross-sectional view of section 13-13 of FIG. 10, showing the conductor bar in the rotor slot prior to skewing the lamination stack, the shorting ring, and the conductor bar;

FIG. 13B is the partial cross-sectional view of FIG. 13A after skewing the lamination stack, the shorting ring, and the conductor bar;

FIG. 13C is the partial cross-sectional view of FIG. 13B after further skewing the shorting ring to bend the bar ends of the conductor bars to a locking angle to lock the lamination pack.

DETAILED DESCRIPTION

Figure 5:
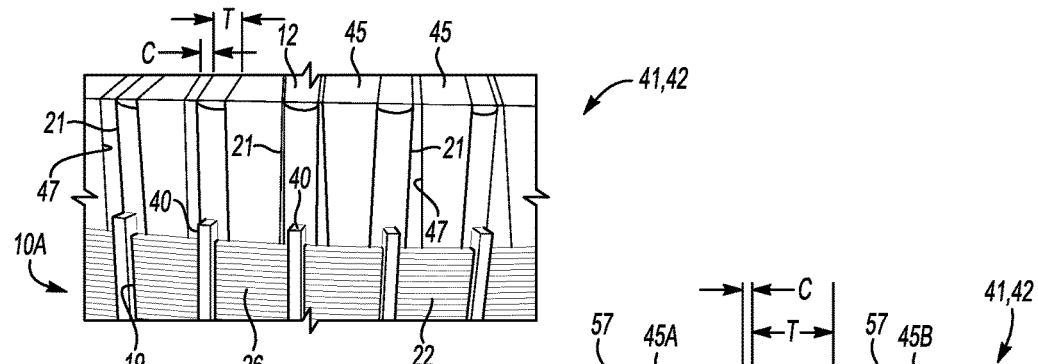
FIG. 5 is a partial side view of the first rotation plate positioned on one end face of the lamination stack such that the plurality of conductor bar ends extending from the one end face extend into the plate slots of the rotation plate.

Referring to FIG. 1, a lamination pack is generally indicated at 10 and is shown in a first forming stage as a straight pack 10A. The lamination pack 10 and a method of forming the lamination pack 10 are described herein. The lamination pack 10 may be useful as a component of a rotor (not shown), where the rotor may be useful as a component of an electromagnetic machine (not shown) for automotive applications, e.g., as a component of an alternating current induction motor for a vehicle (not shown). However, the lamination pack 10 may also be useful as a component of a rotor used for non-automotive applications, including use as a component of a generator or electric motor for residential and commercial applications. Referring to the Figures, wherein like reference numerals refer to like elements, a lamination pack 10 is generally indicated at 10. During the various stages of forming the lamination pack 10, the lamination pack 10 is identified in the various figures and in the description as a straight pack 10A during a first stage of forming, as a skewed pack 10B during a second stage of forming, and as locked pack 10C during a third stage of forming, where the first, second and third stages of forming are performed sequentially. For example, the lamination pack 10 is shown as a straight pack 10A in FIGS. 1, 8A and 13A, where a bar axis 11 of each of the conductor bars 12 is aligned with the rotation axis 13. The lamination pack 10 is shown as a skewed pack 10B in a second forming stage in FIGS. 8B and 13B, and as a locked pack 10C in a third forming stage in FIGS. 8C and 13C. The method of forming the lamination pack 10 uses, in a first embodiment shown in FIGS. 1 through 8C, a first apparatus generally indicated at 14 in FIG. 1 including first and second rotation plates. In a second embodiment shown in FIGS. 9-13C, the method of forming the lamination pack 10 uses a second apparatus generally indicated at 16 in FIG. 9 including a rotation tool 17 and fixture 18. The elements shown in FIGS. 1-13C are not necessarily to scale or proportion. Accordingly, the particular dimensions and applications provided in the drawings presented herein are not to be considered limiting.

Figures 8A, 8B, 8C:
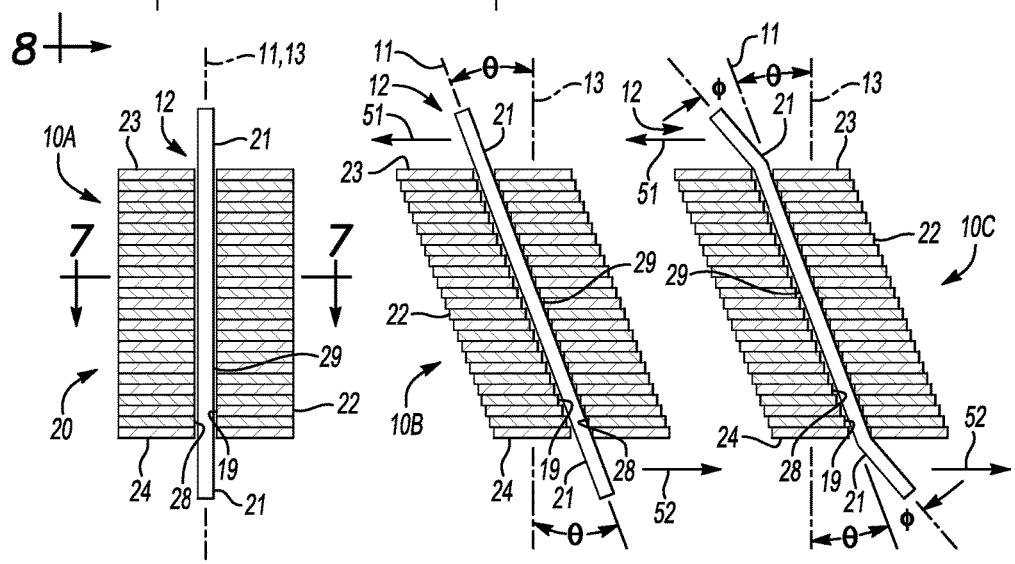
FIG. 8A is a partial cross-sectional view of section 8-8 of FIG. 7, showing the conductor bar in the rotor slot prior to skewing the lamination stack and conductor bars.
FIG. 8B is the partial cross-sectional view of FIG. 8A after skewing the lamination stack and conductor bars and prior to bending the bar ends of the conductor bar.
FIG. 8C is the partial cross-sectional view of FIG. 8B after bending the bar ends of the conductor bar to a locking angle.

Generally, and referring to the partial sectional views shown in FIGS. 8A-8C and 13A-13C, the method of forming the lamination pack 10 generally includes forming a straight pack 10A, skewing the straight pack 10A to form a skewed pack 10B, then bending the ends of the conductor bars 12 extending from the skewed pack 10B to form a locked pack 10C. The straight pack 10A, which is shown in FIGS. 1 and 9, is formed by inserting a plurality of conductor bars 12 into a plurality of rotor slots 19 defined by a lamination stack 20 such that opposing bar ends 21 of the conductor bars 12 extend axially from opposing proximal and distal end faces 23, 24 of the lamination stack 20 and such that the longitudinal bar axis 11 of each bar 12 is parallel to the longitudinal rotation axis 13 of the lamination stack 20. The skewed pack 10B is formed by skewing the lamination stack 20 and the conductor bars 12 of the straight pack 10A to a skew angle θ relative to a rotation axis 13 of the lamination stack 20. A clamping force is applied to the lamination stack 20 of the skewed pack 10B to retain the relative position of the laminations 22 and the conductor bars 12 in the skewed configuration during forming of a locked pack 10C. While maintaining the clamping force, the respective proximal and distal bar ends 21 of the conductor bars 12 are bent to a bend angle Φ relative to the bar axis 11, e.g., the bar ends 21 are bent to a locking angle (θ+Φ) relative to the rotation axis 13, where the locking angle (θ+Φ) is defined by the skew angle θ and the bend angle Φ and is in the same radial direction as and greater than the skew angle θ. As shown in FIG. 8C, the distal bar ends 21 are bent in a first radial direction, and the proximal bar ends 21 are bent in a second radial direction opposing the first radial direction, such that the distal and radial bar ends 21 of each conductor bar 12 are bent in opposing radial directions such that each of the distal and radial bar ends 21 exerts an axial compressive force on a respective distal and radial face of the skewed lamination stack 20, thereby forming the locked pack 10C and exerting an axial compressive locking force on the skewed lamination stack 20 to prevent axial and radial movement of the laminations 22 relative to each other and to prevent axial and radial movement of each conductor bar 12 in its respective rotor slot 19. Bending the bar ends 21 to lock the bar ends 21 and conductor bars 12 to the skewed lamination stack 20 creates a locked pack 10C which is advantaged by the prevailing compressive axial locking force exerted and maintained by the bent bar ends 21 compressing the lamination stack 20 such that the lamination pack 10 resists high frequency vibration of the conductor bars 12 in the stack 20 during operation of a rotor including the lamination pack 10 in a motor, and maintains the density of the stack 20 at a predetermined packing ratio such that the rotor including the lamination pack 10 delivers consistent and relatively high power density over time and resists cogging.

Referring to FIG. 1, in a first embodiment, the lamination pack 10 is shown in a first forming stage as a straight pack 10A provided to the apparatus 14. The apparatus 14 is operable to skew the straight pack 10A to form the skewed pack 10B, to compress the lamination stack 20 after skewing and prior to bending the bar ends 21, and to bend each respective bar end 21 relative to an intermediate portion 29 of each respective bar to form the locked pack 10C. The straight pack 10A provided to the apparatus 14 includes a lamination stack generally indicated at 20 and a plurality of conductor bars 12, where each of the bars 12 is inserted through a respective rotor slot 19 of a plurality of rotor slots 19 defined by the lamination stack 20. The lamination stack 20 has opposing end faces spaced apart from each other and referred to herein as a proximal face 23 and a distal face 24. The lamination stack 20 defines a bore 25 therethrough extending from the proximal face 23 to the distal face 24. The bore 25 defines a rotation axis 13 of the lamination pack 10 and is configured to receive a rotor shaft. In use in a rotor, the rotor including the lamination pack 10 rotates on the rotor shaft such that in use the rotation axis 13 of the bore 25 is substantially coincident with the axis of the rotor shaft. The rotor slots 19 defined by the lamination stack 20 are distributed radially about a periphery 26 of the lamination stack 20, each rotor slot 19 extending from the proximal face 23 to the distal face 24. The lamination stack 20 includes a plurality of laminations 22 stacked adjacent to each other. Each lamination 22 defines a center hole 27 and a plurality of lamination slots 28 distributed radially about a periphery 26 of the lamination 22. In the example shown, each lamination 22 is a steel lamination 22 consisting of an individual annular layer of, for example, silicon steel. In the partially formed condition shown in FIG. 1, the straight pack 10A includes the lamination stack 20 having the laminations 22 stacked adjacent each other to define the bore 25, where the laminations 22 are radially aligned relative to each other such that the lamination 22 slots are aligned in the lamination stack 20 to define the plurality of rotor slots 19. Each of the rotor slots 19 extends the axial length of the straight pack 10A such that each rotor slot 19 of the straight pack 10A is substantially parallel to the rotation axis 13.

Figure 7:
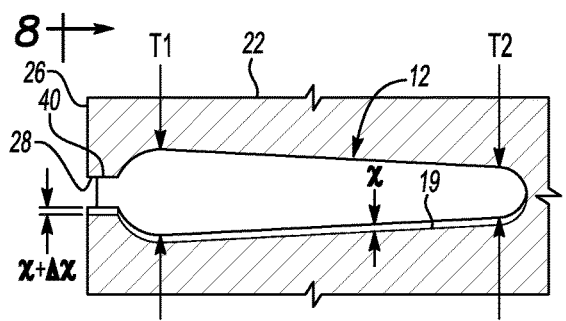
FIG. 7 is a partial cross-sectional view of section 7-7 of FIG. 8A showing the clearance between the conductor bar and a lamination slot of the lamination stack of FIG. 1, prior to skewing the lamination stack and conductor bars.

As shown in FIG. 7, each lamination slot 28 is configured to receive a conductor bar 12 to form the straight pack 10A including a plurality of conductor bars 12. By way of non-limiting example, the straight pack 10A may include from about 30 to about 100 conductor bars 12 spaced about the axis of rotation. Each conductor bar 12 may be configured to conduct electrical current during operation of an electromagnetic machine (not shown) including the lamination pack 10, and each conductor bar 12 may therefore be formed from an electrically-conductive material. For example, each conductor bar 12 may be formed from copper or a copper alloy, such as a copper nickel alloy or a copper boron alloy. In another example, each conductor bar 12 may be formed from aluminum or an aluminum alloy. Each of the conductor bars 12 includes an intermediate portion 29 disposed between opposing first and second bar ends 21. Each of the conductor bars 12 is inserted into a respective rotor slot 19 of the lamination stack 20, such that the intermediate portion 29 of the conductor bar 12 is disposed within the rotor slot 19 and such that the first bar end 21 extends from the proximal face 23 of the lamination stack 20 and the second bar end 21 extends from the distal face 24 of the lamination stack 20, as shown in FIG. 1. As referred to herein, the bar axis 11 of the conductor bar 12 is defined by the intermediate portion 29 of the bar 12.

The laminations 22 may be stacked and the conductor bars 12 may be inserted in the lamination stack 20 by any suitable means to provide the straight pack 10A shown in FIG. 1. By way of non-limiting example, each steel lamination 22 may be individually stamped and then subsequently stacked and pressed adjacent another steel lamination 22 using a mandrel 30 to form the lamination stack 20. By way of non-limiting example, the conductor bars 12 may be manually inserted into the rotor slot 19 by hand, or each conductor bar 12 may be inserted into a respective rotor slot 19 by an automated process or machine. The process of inserting the conductor bars 12 into the rotor slots 19 may further include aligning the conductor bars 12 relative to each other such that the length to which each of the first bar ends 21 extends from the proximal face 23 of the lamination stack 20 is substantially the same, and the length to which each of the second bar ends 21 extends from the proximal face 23 of the lamination stack 20 is substantially the same. In one example, the straight pack 10A may be assembled and then retained on the mandrel 30, which may be a mandrel such as the mandrel 30 shown in the apparatus 14 of FIG. 1, such that the straight pack 10A may be assembled on the mandrel 30 and retained on the mandrel 30 by a retainer 31 to form a mandrel assembly 32. The mandrel assembly 32 including the mandrel 30, the retainer 31, and the straight pack 10A may then be provided to the apparatus 14,16 for subsequent forming of the straight pack 10A into the lamination pack 10 as further described herein.

In a first non-limiting example shown in FIG. 1, the mandrel 30 includes a shank 33 configured to receive the straight pack 10A, and/or to receive the individual laminations 22, where the laminations 22 are stacked on the mandrel 30 to form the lamination stack 20 and/or the straight pack 10A. The shank 33 may be characterized by a shank 33 diameter which allows for slip fit of the center hole 27 of the laminations 22 and/or the bore 25 of the lamination stack 20 to the shank 33, such that the shank 33 diameter may be marginally smaller than the diameter of the bore 25. The mandrel 30 includes a head 34 defining a clamp face 35 configured such that when the lamination stack 20 is positioned on the mandrel 30, the proximal face 23 of the lamination stack 20 is adjacent the clamp face 35 and in contact with the clamp face 35.

The mandrel 30 is configured to be adjustably fastened to the retainer 31 after the straight pack 10A is received onto the mandrel 30, to form the mandrel assembly 32. In the illustrative example shown in FIG. 1, the mandrel 30 includes a fastening interface 36 which in the example is a threaded stud 36. The stud 36 may be adjustably fastened to fastening interface 37 of the retainer 31, which in the example is a threaded hole 37 in the retainer 31. The retainer 31 defines a retainer face 38 configured such that when the lamination stack 20 is positioned on the mandrel 30 and the retainer 31 is fastened to the mandrel 30, the distal face 24 of the lamination stack 20 is adjacent the retainer face 38 and in contact with the retainer face 38. The position of the retainer face 38 relative to the clamp face 35, e.g., the axial distance between the retainer face 38 and the clamp face 35, may be adjusted by adjusting the position of the retainer 31 relative to the head 34 by adjusting the threaded connection between the stud 36 and the threaded hole 37. In the example shown in FIG. 1, the mandrel 30 includes an adjustment interface 39 configured in the example as a hex drive 39. The adjustment interface 39 is adjustable to exert a torque on the mandrel 30 to change the axial length between the retainer face 38 and the clamp face 35 by adjustment of the threaded connection, to change a compressive clamping force exerted by the retainer 31 and the head 34 of the mandrel 30 on the lamination stack 20 via the retainer face 38 in contact with the distal face 24 of the lamination stack 20 and the clamp face 35 in contact with the proximal face 23 of the lamination stack 20. It would be understood that the clamping force exerted on the lamination stack 20 would be proportional to the torque input to the adjustment interface 39, such that the torque input to the adjustment interface 39 could be controlled to control the magnitude of the clamping force exerted by the clamp face 35 and retainer face 38 on the lamination stack 20.

For example, during forming of the lamination stack 20, the laminations 22 may be positioned on the shank 33 of the mandrel 30 and retained to the mandrel 30 by the retainer 31 fastened to the mandrel 30 with the retainer 31 adjusted such that the retainer 31 and the head 34, via respectively, the retainer face 38 and the clamping face 35, cooperate to exert a compressive clamping force on the lamination stack 20. The magnitude of the clamping force exerted on the lamination stack 20 may be adjusted via the threaded connection to exert an "aligning force," where the term "aligning force," as used herein, refers to a clamping force of a magnitude which is sufficient to hold the laminations 22 in axial contact with each other, e.g., to minimize or prevent axial movement of the laminations 22, however still allow radial rotation of each lamination 22 relative to adjacent laminations 22 in the lamination stack 20, such that the laminations 22 can be rotated radially relative to each other to "align" the lamination slots 28 to define the plurality of rotor slots 19, and such that the plurality of rotor slots 19 can be aligned in a predetermined orientation to the rotation axis 13 and to each other. After alignment of the lamination slots 28, the retainer 31 may be further tightened to the lamination stack 20 by adjusting the threaded connection to decrease the axial distance between the retainer face 38 and the clamp face 35, to exert a "retaining force" on the lamination stack 20, where the term "retaining force" as used herein refers to a clamping force of a magnitude which is sufficient to prevent axial movement and prevent radial rotation of the laminations 22 relative to each other, to "retain" both the axial and radial alignment of each of the laminations 22 relative to adjacent laminations 22 in the lamination stack 20.

In the present example, the straight pack 10A is formed by receiving the lamination stack 20 on the mandrel 30, exerting an aligning force to orient the laminations 22 axially adjacent to each other, and, while maintaining the aligning force on the lamination stack 20, rotating the laminations 22 relative to each other to align the lamination slots 28 to form the rotor slots 19, such that the rotor slots 19 are substantially parallel to each other and parallel to the rotation axis 13. The aligning force is maintained during insertion of a conductor bar 12 into each of the rotor slots 19, to form the straight pack 10A shown in FIG. 1, including the conductor bars 12 and lamination stack 20, where each of the conductor bars 12 and each of the rotor slots 19 are substantially parallel to each other and parallel to the rotation axis 13. The lamination stack 20 may be retained on the mandrel 30 clamped in this manner for transfer of the mandrel assembly 32 including the straight pack 10A to the forming operations shown in FIGS. 1 and 9.

Referring to FIG. 7, a cross-sectional view of the conductor bar 12 disposed within the rotor slot 19 of the straight pack 10A is shown. As shown in FIG. 7, the thickness T of the conductor bar 12 may vary along the radial length of the conductor bar 12. In the example shown in FIG. 7, the conductor bar 12 defines a tapered portion that tapers radially from a thickness $T_1$ to a thickness of $T_2$. In the example shown, the conductor bar 12 further includes an axial tab 40 extending the axial length of the intermediate portion 29. As shown in FIG. 7, each of the lamination slots 28 forming the rotor slot 19 is contoured to the cross-sectional shape of the conductor bar 12, and to provide a clearance gap x between the rotor slot 19 and the conductor bar 12 along the radial length A of the conductor bar 12. In the example shown, the clearance gap x is of a constant width along the tapered portion of the conductor bar 12 between $T_1$ and $T_2$. The lamination slot 28 defines a tab slot which opens to the periphery 26 of the lamination stack 20 to receive the tab 40 during insertion of the conductor bar 12 to the rotor slot. The tab slot is configured to provide a clearance gap x+Δx between the tab 40 and the tab slot, where x+Δx is greater than x. In one example, Δx=0.005 mm. The clearance gaps x and x+Δx allow for insertion of the conductor bar 12 through the lamination slot 28. Further, the width x of the clearance gap is configured such that after skewing of the straight pack 10A shown in partial view in FIG. 8A to form the skewed pack 10B shown in partial view in FIG. 8B, the clearance gap x between the conductor bar 12 and each lamination slot 28 is closed as shown in FIG. 8B, such that the opposing sides of the conductor bar 12 are each in contact with the adjacent surfaces of the lamination 22 defining the lamination slot 28, and such that the interference between the skewed laminations 22 and skewed conductor bar 12 constrains axial and radial movement of the conductor bar 12 in the skewed pack 10B.

Referring to FIGS. 1-4, a first embodiment of an apparatus 14 is generally indicated at 14 and is operable to form the lamination pack 10. The apparatus 14 includes a first rotation plate 41 and a second rotation plate 42. Each of the first and second rotation plates 41, 42 defines an inboard surface 43 configured to interface with and be in contact with a respective end face 22, 23 of the straight pack 10A when the straight pack 10A is positioned in the apparatus 14 as shown in FIGS. 2-4, such that in this position each of the inboard surfaces 43 is oriented axially inboard relative to the lamination pack 10. Each of the first and second rotation plates 41, 42 includes a central opening 44 which is of sufficient size to receive the head 34 of the mandrel 30 and/or the retainer 31. In the example shown, the opening 44 of at least one of the rotation plates 41, 42 has a diameter which is slightly larger than the diameter of the head 34, such that the head 34 has clearance to pass through and/or be received into the opening 44, and the opening 44 of at least the other of the rotation plates 41, 42 has a diameter which is slightly larger than the diameter of the retainer 31, such that the retainer 31 has clearance to pass through and/or be received into the opening 44.

Each of the rotation plates 41, 42 defines a plurality of plate teeth 45 which are distributed radially about the periphery 46 of the plates 41, 42 to define a plurality of plate slots 47, where the plate slots 47 are arranged to receive the plurality of bar ends 21 extending from end faces 23, 24 of the straight pack 10A, as shown in FIG. 1. As shown in FIGS. 2-4, in a first stage of forming, the straight pack 10A is positioned in the apparatus 14 such that the inboard surface 43 of the first rotation plate 41 is adjacent to and interfaces with the proximal face 23 of the straight pack 10A, and the head 34 of the mandrel 30 is received into the opening 44 of the first rotation plate 41. Each of the plurality of bar ends 21 extending from the proximal face 23 is received into a respective one of the plurality of plate slots 47 defined by the first rotation plate 41. The second rotation plate 42 is positioned on the straight pack 10A opposing the first rotation plate 41 such that the inboard surface 43 of the second rotation plate 42 is adjacent to and interfaces with the distal face 24 of the straight pack 10A, and the retainer 31 is received into the opening 44 of the second rotation plate 42. Each of the plurality of bar ends 21 extending from the distal face 24 is received into a respective one of the plurality of plate slots 47 defined by the second rotation plate 42. During this first stage of forming, which comprises positioning the rotation plates 41, 42 at opposing ends of the straight pack 10A, the rotation plates 41, 42 are aligned to each other such that each of the conductor bars 12 and rotor slots 19 of the straight pack 10A is parallel to the rotation axis 13, as shown in FIG. 8A in a representative side view showing one of the conductor bars 12 disposed in a rotor slot 19 during the first stage of forming.

During the second stage of forming the lamination pack 10, the rotation elements 48,49 are rotated in opposing radial directions by a predetermined skew angle θ to form the skewed pack 10B. In the example shown in FIGS. 1-4, the first rotation plate 41 includes a first rotation element 48 and the second rotation plate 42 includes a second rotation element 49, where the first and second rotation elements 48,49 are rotatable to rotate the first and second plates 41, 42 in opposing directions when affixed to the straight pack 10A, to skew the conductor bars 12 relative to the rotation axis 13 by contact of the plate teeth 45 with the bar ends 21 during rotation of the plates 41, 42. Skewing of the conductor bars 12 displaces the laminations 22 radially relative to each other, as shown in FIG. 8B, to form the skewed pack 10B, where each of the conductor bars 12 are skewed relative to the rotation axis 13 by the skew angle θ. After skewing the straight pack 10A shown in FIG. 8A to form the skewed pack 10B shown in FIG. 8B, the mandrel 30 and retainer 31 of the mandrel assembly 59 are adjusted to exert a retaining force on the skewed pack 10B, thereby preventing both axial and radial movement of each lamination 22 relative to each other lamination 22 in the skewed pack 10B.

During a third stage of forming the lamination pack 10, and while exerting the retaining force on the skewed pack 10B to prevent axial and radial movement of the laminations 22 in the skewed pack 10B, the rotation elements 48,49 are incrementally rotated in opposing radial directions 51,52 by a predetermined amount, for example, by a predetermined number of degrees, to exert a bending force on the bar ends 21 extending from the proximal and distal end faces 23, 24 of the lamination stack 20, to bend each respective bar end 21 relative to the intermediate portions 29 of the respective bar 12 and relative to the bar axis 11 of the respective bar 12 by a bend angle Φ, to lock each of the bar ends 21 to the lamination stack 20, thus forming the locked pack 10C. The bar ends 21 bent in opposing directions at the opposing end faces 23, 24 of the lamination stack 20 exert an axial compressive locking force on the lamination stack 20, as shown in FIG. 8C, to form the locked pack 10C. The "locking force", as that term is used herein, refers to the axial compressive force exerted by the opposing bent bar ends 21 of each conductor bar on the skewed lamination stack 20, e.g., on the locked pack 10C shown in FIG. 8C. The "locking force" collectively exerted on the skewed lamination stack 20 by the opposing bent bar ends 21 of the plurality of bent conductor bars 12 is sufficient to prevent both axial and radial movement of the laminations 22 in the lamination stack 20 and to prevent both axial and radial movement of the conductor bars 12 relative to the rotation axis 13 before and after removal of the mandrel 30 and retainer 31 from the locked pack 10C, thus forming the locked pack 10C shown in part in FIG. 8C.

In the illustrative example shown in FIGS. 1-4, the first rotation element 48 is configured as a hexagonal element 48 having a plurality of pairs of opposing flats 50, such that the first rotation element 48 can receive and be rotated by a driver (not shown) compatible with at least one of the pairs of opposing flats 50 to rotate the first rotation plate 41 relative to the rotation axis 13. In one example, the second rotation element 49 is configured as a truncated cylinder defining a pair of opposing flats 50, such that the second rotation element 49 can receive a driver compatible with the pair of opposing flats 50. In one example, the drivers are attachable respectively to the first and second rotation elements 48,49 and rotatable in opposing directions to rotate the first and second plates 41, 42 in opposing directions, where the direction of rotation of the first rotation plate 41 relative to the second rotation plate 42 is indicated by arrow 51 in FIG. 3 and the direction of rotation of the second rotation plate 42 relative to the first rotation plate 41 is indicated by arrow 52 in FIG. 3.

Figure 6:
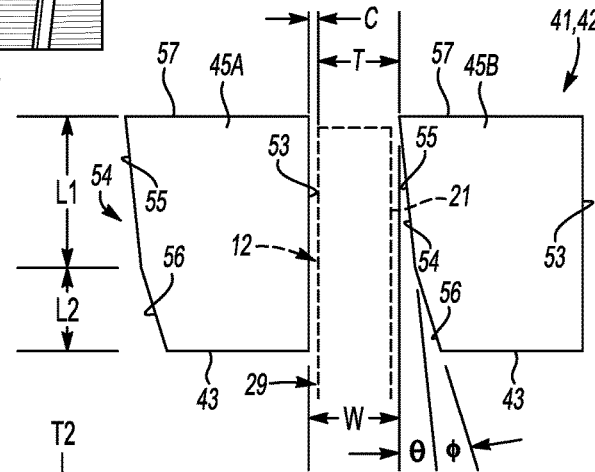
FIG. 6 is a side view of one of the plate slots shown in FIG. 5.

Each of the first and second plates 41, 42 defines a plurality of plate slots 47 shown in detail in FIGS. 5 and 6. Each plate slot 47 is defined by a pair of immediately adjacent plate teeth 45A, 45B. As shown in detail in FIGS. 6 and 7, the plate slot 47 is defined on one side by a support face 53 of a plate tooth 45A and on the other side by a contoured face 54 of an immediately adjacent plate tooth 45B. The support face 53 is configured to support the bar end 21 during the second stage of forming, e.g., during skewing of the straight pack 10A to form the skewed pack 10B shown in partial view in FIG. 8B, and to support the bar end 21 during the third stage of forming, e.g., during bending of the opposing bar ends 21 to form the locked pack 10C shown in partial view in FIG. 8C. In the example shown, the support face is generally planar and parallel to the rotation axis 13. The contoured face 54 includes a skew face 55 extending an axial length L1 of the plate and a bend face 56 extending an axial length L2 of the plate, where the bend face 56 is disposed intermediate the skew face 55 and the inboard surface 43 of the plate. The axial lengths L1 and L2 are related by the equation:

$$L1 = 2(L2) \quad (2)$$

such that L1 is two-thirds the length of the tooth 45, e.g., L1=2/3(L1+L2).

The skew face 55 is defined by a skew angle θ which is equivalent to the skew angle θ of the conductor bars 12 of the skewed pack 10B, shown in partial sectional view in FIG. 8B, where the skew angle θ is relative to the rotation axis 13. The skew angle θ may be defined by the operating and/or performance requirements of the rotor including the lamination pack 10. The bend face 56 is defined by a bend angle Φ which is the bend angle Φ by which the bar ends 21 of each conductor bar is bent relative to the intermediate portion 29 of the respective bar 12 and relative to the bar axis 11 defined by the respective intermediate portion 29, shown in partial sectional view in FIG. 8C. As shown in FIG. 8C, the bar end 21 extending from the proximal face 23 of the lamination stack 20 is bent by the bend angle Φ in the direction indicated by arrow 51, and the opposing bar end 21 of the same conductor bar extending from the distal face 24 of the lamination stack 20 is bent by the bend angle Φ in the opposing direction indicated by arrow 52. The bend angle Φ is relative to the skew angle θ, such that the bent bar ends 21 of the locked pack 10C shown in FIG. 8C are bent to a locking angle defined as (θ+Φ) relative to the rotation axis 13. The bend angle Φ is determined such that the bar ends 21 extending from the respective end faces 23, 24 of the skewed pack 10B, when bent to the bend angle Φ while exerting the retaining force on the skewed pack 10B to form the locked pack 10C, compress the lamination stack 20 to a specified load defining the lamination stack 20 packing ratio. The specified load exerted by the bent bar ends 21 on the skewed lamination stack 20 of the locked pack 10C is also referred to herein as the locking force. After removing the retaining force, for example, by removing the mandrel 30 and retainer 31 from the locked pack 10C, the bent bar ends 21 continue to exert the locking force such that the locked pack 10C maintains the defined lamination stack packing ratio. In one example, the bending angle Φ is approximately two degrees (2°) and the skew angle θ is approximately six degrees (6°) such that the locking angle (θ+Φ) is approximately eight degrees (8°) relative to the rotation axis 13. In one example, the skew angle θ is 6.43°, the bend angle Φ is 2°, and the locking angle (θ+Φ) of 8.43°.

In the example shown in FIG. 6, the plate slot 47 is characterized by a slot width W, where:

$$W = T + C \quad (2)$$

and where T is the radial thickness T of the conductor bar 12, and C is a clearance between the conductor bar 12 and the plate slot 47 where the skew face 55 terminates at an outboard surface 57 of the plates 41, 42 as shown in FIG. 6. The width W of the plate slot 47 is equal to the thickness T of the bar plus the clearance C to allow for twist during skewing of the straight pack 10A to form the skewed pack 10B, such that the bar follows the curvature of the helix of the rotor slots 19 of the lamination stack 20. The width W allows for twisting of the bar when forming the skewed pack 10B, without pinching the bar ends 21. The width W allows sufficient clearance such that the rotation plates 41, 42 can be removed from the bend pack 10C after bending of the bar ends 21 to the bend angle Φ. The twist for the bar across the width W of the bar is estimated by the equation:

$$\text{Twist} = \frac{1}{m} - \sqrt{\left(\frac{1}{m}\right)^2 - \left(\frac{L}{2}\right)^2} \quad (3)$$

where:

$$L = L1 + L2 \quad (4)$$

and m is defined by the equation:

$$m = \frac{\left(\frac{L}{\theta}\right)}{(R)^2 - \left(\frac{L}{\theta}\right)^2} \quad (5)$$

where R is the radius of the lamination. The clearance C is defined by the equation:

$$C = ((\text{Twist}) \times (L1 + L2)/L) - T \quad (6)$$

where T, as described previously, is the radial thickness of the conductor bar. As shown in FIG. 7, the width W of the plate slot 47 varies as the thickness T of the bar varies along the radial length of the bar, for example, from T1 to T2.

FIGS. 8A, 8B and 8C show a partial section of the lamination pack 10 at each stage of forming, and are illustrative of a method of forming a lamination pack 10 using the apparatus 14 shown in FIGS. 1-4. FIG. 8A shows the straight pack 10A which may be assembled on a mandrel 30 (as shown in FIGS. 1-4), where in the first stage of forming the lamination pack 10, the laminations 22 are stacked such that each rotor slot 19 defined by the lamination stack 20 is substantially parallel to the rotation axis 13, and each conductor bar 12 is inserted in each respective rotor slot 19 is substantially parallel to the rotation axis 13. The straight pack 10A may be retained on the mandrel 30 by a retainer 31 adjusted to exert an aligning force on the lamination stack 20 to maintain axial alignment of the laminations 22 relative to each other, while allowing radial rotation of each lamination relative to the other laminations 22 in the lamination stack 20.

As shown in FIGS. 1-4, during the second stage of forming the lamination pack 10, a first rotation plate 41 is positioned on the proximal face 23 of the straight pack 10A such that the proximal bar ends 21 are received into the plate slots 47 of the first rotation plate 41. The second rotation plate 42 is positioned on the distal face 24 of the straight pack 10A such that the distal bar ends 21 are received into the plate slots 47 of the first rotation plate 41. As received, each bar end 21 is positioned in a respective plate slot 47 such that the bar end 21 is substantially parallel to the support face 53. As the rotation plates 41, 42 are rotated in opposing radial directions as shown by arrows 51, 52, the skew face 55 of each respective plate slot 47 contacts the bar end 21 and exerts a skewing force to skew the conductor bars 12 and laminations 22 to the skew angle as shown in FIG. 8B, to form the skewed pack 10B shown in FIG. 8B.

After forming the skewed pack 10B, the retainer 31 and mandrel 30 are adjusted, e.g., tightened, to increase the clamping force exerted on the lamination stack 20 from an aligning force to a retaining force, where the retaining force is sufficient to prevent both radial and axial movement of the laminations 22 in the skewed pack 10B. The mandrel 30 and retainer 31 may be adjusted to exert a retaining force that achieves a predetermined and/or minimum packing density of the lamination stack 20, to remove and/or minimize entrapped air in the lamination stack 20.

In the third forming step, and while the mandrel 30 and retainer 31 maintain a retaining clamping force on the skewed pack 10B, the rotation plates 41, 42 are incrementally rotated in opposing radial directions as shown by the arrows 51, 52, such that the bend face 56 of each respective plate slot 47 contacts the bar end 21 and exerts a bending force on the respective bar end 21. The bending force exerted on each respective bar end 21 is resisted by the intermediate portion 29 of the respective bar disposed in a respective rotor slot 19 of the skewed pack 10B, where the skewed laminations 22 are retained in the skewed position by the retaining force exerted by the mandrel assembly 32, such that the bending force acts on the bar ends 21 to bend the bar ends 21 to the bend angle Φ relative to the intermediate portion 29 of each bar 12, where the bend angle Φ originates at a bend point at the interface of the bar end 21 and the respective one of the end faces 23, 24 from which the bar 12 end is extending, as shown in FIG. 8C. The bar ends 21 bent in opposing directions at the opposing end faces 23, 24 of the lamination stack 20 exert an axial compressive locking force on the lamination stack 20, as shown in FIG. 8C, to form the locked pack 10C. The "locking force", as that term is used herein, refers to the axial compressive force exerted by the opposing bent bar ends 21 of each conductor bar on the skewed lamination stack 20. The "locking force" collectively exerted on the skewed lamination stack 20 by the opposing bent bar ends 21 of the plurality of bent conductor bars 12 is sufficient to prevent both axial and radial movement of the laminations 22 in the lamination stack 20 and to prevent both axial and radial movement of the conductor bars 12 relative to the rotation axis 13 before and after removal of the mandrel 30 and retainer 31 from the locked pack 10C, thus forming the locked pack 10C shown in part in FIG. 8C. In one example, the locking force exerted by the bent bar ends 21 is sufficient to achieve a predetermined minimum packing ratio of the lamination 22 pack 10C and to prevent axial and radial movement of the conductor bars 12 and laminations 22, such that the locked pack 10C is advantaged by being resistant to high frequency vibration of the conductor bars 12 in the stack 20 during operation, for example in a motor, of a rotor including the lamination pack 10. The locking force exerted by the bent bar ends 21 is maintained over a useful lifetime of the lamination pack 10, thereby maintaining the density of the stack 20 at the predetermined packing ratio over time, such that the rotor including the lamination pack 10 delivers consistent and relatively high power density over time and is resistant to cogging.

After forming the locked pack 10C, the locked pack 10C may be further processed to form a rotor including the locked pack 10C, for example, by shorting together the bar ends 21 extending from the distal face 24 of the lamination stack 20 to electrically connect the distal bar ends 21, and shorting together the bar ends 21 extending from proximal face 23 of the lamination stack 20 to electrically connect the proximal bar ends 21, to form the rotor, such that electrical current can be conducted through the electrically connected (shorted) plurality of conductor bars 12. By way of non-limiting example, the bar ends 21 may be welded or soldered together to electrically connect the conductor bars 12. In another example, first and second end rings may be formed separately, and then subsequently welded, brazed, or soldered onto the respective first and second plurality of bar ends 21 extending respectively from the proximal and distal faces 23, 24 of the lamination stack 20. In another example, an end ring may be overcast onto each respective end face 23, 24 of the locked pack 10C, where the overcast end ring is made from an electrically conductive metal such as, by way of non-limiting example, copper, a copper alloy, aluminum, or an aluminum alloy, to electrically connect the plurality of bar ends 21 extending from the respective end face 23, 24. In other non-limiting examples, the end ring may be pressure cast, gravity cast, or die cast over the plurality of bar ends 21 extending from each end face 23, 24 of the locked pack 10C.

Referring to FIGS. 9-13, another illustrative example of a method and apparatus 16 for forming a lamination pack 10 including the locked pack 10C is shown. In this embodiment, an end ring 60 defining a plurality of ring slots 68 distributed radially about the periphery 46 of the end ring 60 is positioned adjacent each of the distal face 24 and the proximal face 23 of the straight pack 10A, such that each of the plurality of bar ends 21 extending from the respective end face 23, 24 is received into a respective one of the plurality of ring slots 68 defined by the end ring 60, and such that, in the locked pack 10C shown in FIG. 13C, each of the bar ends 21 is electrically connected to the end ring 60. The end ring 60 is formed of a plurality of stacked shorting sheets 61, as further described herein, and may be referred to herein as a shorting ring. The straight pack 10A may be formed as previously described for FIG. 1, such that the straight pack 10A includes a lamination stack 20 consisting of a plurality of stacked laminations 22 defining a plurality of rotor slots 19. Each of a plurality of conductor bars 12 is inserted into a respective one of the plurality of rotor slots 19 such that a first bar end 21 of each bar extends from the proximal face 23 of the lamination stack 20 and a second bar end 21 of each bar extends from the distal face 24 of the lamination stack 20, with the intermediate portion 29 of each bar 12 contained within the rotor slot. As described for FIG. 1, the straight pack 10A may be assembled on a mandrel, which by way of non-limiting example may be one of the mandrels 30 shown in the mandrel assemblies 32, 59 shown in FIGS. 1 and 9. In FIGS. 9 and 10 a mandrel assembly 59 including a mandrel 30, a retainer 31, and fastening elements 58 for fastening the retainer 31 to the mandrel 30 is shown. In one example, the straight pack 10A may be assembled on the mandrel 30 and retained on the mandrel 30 by the retainer 31 and fastening elements 58, to form a mandrel assembly 59. The mandrel assembly 59 including the mandrel 30, the retainer 31, the fastening elements 58, and the straight pack 10A may then be provided to the apparatus 16 for subsequent forming of the straight pack 10A into the lamination pack 10 as further described herein.

In the non-limiting example shown in FIGS. 9 and 10, the mandrel 30 includes a shank 33 and a head 34 defining a clamp face 35, as described related to FIG. 1 and configured such that when the lamination stack 20 is positioned on the mandrel 30, the proximal face 23 of the lamination stack 20 is adjacent the clamp face 35 and in contact with the clamp face 35. The mandrel 30 shown in FIGS. 9-10 is configured to be adjustably fastened to the retainer 31 after the straight pack 10A is received onto the mandrel 30, to form the mandrel assembly 59. The mandrel 30 includes fastening interfaces 36, which in the illustrative example shown in FIGS. 9-10 are configured as blind holes which are threaded to engage the threaded interfaces 37 of the fastening elements 58. The retainer 31 may be adjustably fastened to the mandrel 30 by the fastening elements 58, where the threaded interface 37 of each fastening element 58 is received into a respective fastening interface 39 of the retainer 31, shown in the present example as a threaded through hole 39, and engages the fastening interface 36 of the mandrel 30. The retainer 31 defines a retainer face 38 configured such that when the lamination stack 20 is positioned on the mandrel 30 and the retainer 31 is fastened to the mandrel 30, the distal face 24 of the lamination stack 20 is adjacent the retainer face 38 and in contact with the retainer face 38. The position of the retainer face 38 relative to the clamp face 35, e.g., the axial distance between the retainer face 38 and the clamp face 35, may be adjusted by adjusting the position of the retainer 31 relative to the head 34 by adjusting the threaded connection between the threaded interfaces 37 of the fastening elements 58, the threaded interfaces 39 of the retainer 31, and the fastening interfaces 36 of the mandrel 30. For example, the fastening elements 58 may be tightened or loosened relative to the mandrel 30 to change the compressive clamping force exerted by the retainer 31 and the head 34 of the mandrel 30 on the lamination stack 20 via the retainer face 38 in contact with the distal face 24 of the lamination stack 20 and the clamp face 35 in contact with the proximal face 23 of the lamination stack 20. It would be understood that the clamping force exerted on the lamination stack 20 would be proportional to the torque input to the fastening elements 58, such that the torque input to the fastening elements 58 could be controlled to control the magnitude of the clamping force exerted by the clamp face 35 and the retainer face 38 on the lamination stack 20.

As described for FIG. 1, during forming of the lamination stack 20, the laminations 22 may be positioned on the shank 33 of the mandrel 30 and retained to the mandrel 30 by the retainer 31 fastened to the mandrel 30 with the retainer 31 adjusted such that the retainer 31 and the head 34, via respectively, the retainer face 38 and the clamping face 35, cooperate to exert a compressive clamping force on the lamination stack 20. The magnitude of the clamping force exerted on the lamination stack 20 may be adjusted via the threaded connection established by the fastening elements 58 in threaded engagement with the retainer 31 and the mandrel 30 to exert an aligning force. As previously described, the term "aligning force" refers to a clamping force of a magnitude which is sufficient to hold the laminations 22 in axial contact with each other, e.g., to minimize or prevent axial movement of the laminations 22, however still allow radial rotation of each lamination 22 relative to adjacent laminations 22 in the lamination stack 20, such that the laminations 22 can be rotated radially relative to each other to "align" the lamination slots 28 to define the plurality of rotor slots 19, and such that the plurality of rotor slots 19 can be aligned in a predetermined orientation to the rotation axis 13 and to each other. After alignment of the lamination slots 28, the retainer 31 may be further tightened to the lamination stack 20 by adjusting the threaded connection established by the fastening elements 58 in threaded engagement with the retainer 31 and the mandrel 30 to decrease the axial distance between the retainer face 38 and the clamp face 35, to exert a retaining force on the lamination stack 20, where the term "retaining force" as used herein refers to a clamping force of a magnitude which is sufficient to prevent axial movement and prevent radial rotation of the laminations 22 relative to each other, to "retain" both the axial and radial alignment of each of the laminations 22 relative to adjacent laminations 22 in the lamination stack 20.

FIGS. 9-12 show the apparatus generally indicated at 16. The apparatus 16 includes a rotation tool generally indicated at 17 and a rotation fixture generally indicated at 18. Each of the rotation tool 17 and the rotation fixture 18 defines a rotation element 64 having an inboard surface 43 configured to interface with and be in contact with an end face 23, 24 of the straight pack 10A when the straight pack 10A and distal and proximal shorting rings 60 are positioned between the rotation tool 17 and rotation fixture 18 of the apparatus 16, and the rotation element 64 of each of the rotation tool 17 and the rotation fixture 18 is received into a respective central aperture 15 of a respective one of the shorting rings 60, as illustrated by FIGS. 9-12. When positioned as shown in FIGS. 10-11, each of the inboard surfaces 43 of the rotation elements 64 of the rotation tool 17 and the rotation fixture 18 is oriented axially inboard relative to the lamination pack 10. The central aperture 15 defines a first rotation interface 62, which in the non-limiting example shown in FIGS. 9-11 is configured as a plurality of keyways 62 which are distributed radially about the central aperture 15. By way of example, the central aperture 15 may also be referred to herein as a keyed aperture 15. Each rotation element 64 defines a second rotation interface 63 corresponding to the first rotation interface 62. The non-limiting example shown in FIGS. 9-11 is configured as a plurality of keys 63 which are distributed radially about the rotation element 64 to correspond to the keyways 62, such that the keyed rotation element 64 can be fitted to and received into the central aperture 15 and the keyways 62 of the shorting ring 60. Each of the rotation tool 17 and the rotation fixture 18 includes a central opening 44 which is of sufficient size to receive the head 34 of the mandrel 30 and/or the retainer 31. In the example shown, the opening 44 of at least one of the rotation tool 17 and rotation fixture 18 has a diameter which is slightly larger than the diameter of the head 34, such that the head 34 has clearance to pass through and/or be received into the opening 44, and the opening 44 of at least the other of the rotation tool 17 and rotation fixture 18 has a diameter which is slightly larger than the diameter of the retainer 31, such that the retainer 31 has clearance to pass through and/or be received into the opening 44.

Referring to FIGS. 9 and 11, each of the shorting rings 60 positioned on the distal and proximal end faces 23, 24 of the straight pack 10A include a plurality of shorting sheets 61 which are stacked and aligned to form the shorting ring 60. In the example shown, each shorting sheet 61 defines a plurality of sheet slots 67 distributed radially about the periphery of the shorting sheet 61 such that when the shorting sheets 61 are stacked and aligned, the aligned sheet slots 67 define the ring slots 68 of the shorting ring 60. Each shorting sheet 61 consists of an individual annular layer of an electrically conductive material, such as copper or aluminum, such that when the shorting ring 60 is operatively connected to the conductor bar ends 21, the shorting ring 60 is operative as an end ring, e.g., the shorting ring 60 electrically connects the plurality of connector bars 12 such that electrical current can be conducted through the electrically connected plurality of conductor bars 12, and such that the lamination pack 10 and the shorting rings 60 form a rotor.

Each shorting ring 60 includes a central aperture 15 which defines a first rotation interface 62 adapted to receive a second corresponding interface 63 defined by the rotation element 64. In the non-limiting example shown, the central aperture 15 is a keyed aperture defining a first corresponding keyway 62. The second corresponding interface 63 defined by the rotation element 64 is configured as a key 63 which can be received into the keyway 62, to exert a rotation force on the shorting ring 60 via the keyway 62. As shown in FIGS. 9-11, the keyed rotation element 64 defines a plurality of keys 63 distributed radially about the periphery of the rotation element 64. The keyed aperture 15 includes a plurality of keyways 62 distributed radially about the circumference of the keyed aperture 15, such that each keyway 62 is arranged to receive a respective key 63 of the rotation element 64. As shown in FIGS. 9-12, each of the rotation tool 17 and the rotation fixture 18 includes a keyed rotation element 64. In the example shown, one shorting ring 60, which may be referred to herein as a distal shorting ring 60, is positioned on the rotation fixture 18 such that the keys 63 of the keyed rotation element 64 of the rotation fixture 18 are received into the keyways 62 of keyed aperture 15 of the distal shorting ring 60, to align the shorting sheets 61 forming the distal shorting ring 60. The bar ends 21 extending from the distal face 24 of the straight pack 10A are received into the ring slots 68 of the distal shorting ring 60, to position the straight pack 10A on the rotation fixture 18, as shown in FIG. 10. Another shorting ring 60, which may be referred to herein as a proximal shorting ring 60, is positioned on the proximal face 23 of the straight pack 10A, such that the bar ends 21 extending from the proximal face 23 of the straight pack 10A are received into the ring slots 68 of the proximal shorting ring 60, where the shorting sheets 61 of the proximal shorting ring 60 are aligned to define the plurality of keyways 62. The keyed rotation element 64 of the rotation tool 17 can be operatively attached to the proximal shorting ring 60 by inserting the keys 63 of the rotation element 64 into the respective keyways 62 defined by the proximal shorting ring 60. In another example, as shown in FIG. 11, the proximal shorting ring 60 can first be formed by stacking the shorting sheets 61 on the rotation element 64 of the rotation tool 17, and the proximal shorting ring 60 and rotation tool 17 can be concurrently placed on the proximal end of the straight pack 10A such that the bar ends 21 extending from the proximal face 23 are received into the ring slots 68 of the proximal shorting ring 60. The example of corresponding interfaces defined by the keyways 62 and the keys 63 is non-limiting, and other configurations of corresponding interfaces 62, 63 may be used to operatively connect a rotation element 64 to the shorting ring 60, such that the rotation element 64 can be rotated to exert a skewing force on the shorting sheets 61.

In a first forming step, using the apparatus 16 shown in FIGS. 9-12, a straight pack 10A is provided to the apparatus 16. After assembling the distal and proximal shorting rings 60 to the mandrel assembly 59 including the straight pack 10A, and operatively attaching the rotation fixture 18 and the rotation tool 17, respectively, to the distal and proximal shorting rings 60, as shown FIGS. 10 and 11, the rotation tool 17 is rotatable, in a second forming step, in a radial direction 51 to rotate the rotation element 64 positioned in the keyed aperture 15 of the proximal shorting ring 60, and the rotation element 64 of the rotation fixture 18 exerts a resistive radial force on the distal shorting ring 60, to skew the straight pack 10A and the shorting sheets 61 of the distal and proximal shorting rings 60 to the skew angle θ, as shown in FIG. 13B, to form the skewed pack 10B. Skewing of the conductor bars 12 displaces the laminations 22 and the shorting sheets 61 radially relative to each other, as shown in FIG. 13B, to form the skewed pack 10B, where each of the conductor bars 12 are skewed relative to the rotation axis 13 by the skew angle θ. After skewing the straight pack 10A shown in FIG. 13A to form the skewed pack 10B shown in FIG. 13B, the mandrel 30, retainer 31 and fastening elements 58 of the mandrel assembly 59 are adjusted to exert a retaining force on the skewed pack 10B, thereby preventing both axial and radial movement of each lamination 22 relative to each other lamination 22 in the skewed pack 10B. As shown in FIG. 10, the clamp face 35 of the mandrel 30 is in direct contact with the proximal face 23 of the skewed pack 10B and the retainer face 38 of the retainer 31 is in direct contact with the distal face 24 of the skewed pack 10B, such that after exerting the retaining force on the skewed pack 10B, the shorting sheets 61 of each shorting rings 60 are not subjected to the retaining force, e.g., the shorting sheets 61 are radially adjustable relative to each other by further rotation of the rotation tool 17.

During a third stage of forming the lamination pack 10, and while exerting the retaining force on the skewed pack 10B to prevent axial and radial movement of the laminations 22 in the skewed pack 10B, the rotation tool 17 including the rotation element 64 is incrementally rotated in the radial direction 51 by a predetermined amount, for example, by a predetermined number of degrees, to exert an incremental skewing force on shorting sheets 61 of each of the shorting rings 60, such that the shorting rings 60 exert a bending force on the bar ends 21 extending from the proximal and distal end faces 23, 24 of the lamination stack 20, to bend each respective bar end 21 relative to the intermediate portions 29 of the respective bar and relative to the bar axis 11 of the respective bar by a bend angle Φ, to lock each of the bar ends 21 to the lamination stack 20, thus forming the locked pack 10C shown in FIG. 13C. The bar ends 21 bent in opposing directions at the opposing end faces 23, 24 of the lamination stack 20 exert an axial compressive locking force on the lamination stack 20, as shown in FIG. 8C, to form the locked pack 10C. The "locking force", as that term is used herein, refers to the axial compressive force exerted by the opposing bent bar ends 21 of each conductor bar 12 on the skewed lamination stack 20. The "locking force" collectively exerted on the skewed lamination stack 20 by the opposing bent bar ends 21 of the plurality of bent conductor bars 12 is sufficient to prevent both axial and radial movement of the laminations 22 in the lamination stack 20 and to prevent both axial and radial movement of the conductor bars 12 relative to the rotation axis 13 before and after removal of the mandrel 30 and retainer 31 from the locked pack 10C, thus forming the locked pack 10C shown in part in FIG. 13C. The rotation element 64 is removable from the keyed aperture 15 after formation of the locked pack 10C. The bent bar ends 21 exert the locking force on the shorting rings 60, thus locking the shorting sheets 61 of the shorting rings 60 to the locked pack 10C, as shown in FIG. 13C, and preventing both axial and radial movement of the locked shorting sheets 61 relative to the rotation axis 13 before and after removal of the rotation element 64 from the keyed aperture 15 of each of the distal and proximal shorting rings 60. As shown in FIG. 13C, the incrementally skewed shorting rings 60 have been skewed to the skew angle θ and incrementally skewed by the bend angle Φ such that each of the shorting sheets 61 is skewed by the locking angle (θ+Φ), when locked as shown in FIG. 13C. Each of the shorting sheets 61 is locked in contact with each conductor bar. The shorting sheets 61 are made from an electrically conductive material such that the shorting sheets 61 in contact with the bend bar ends 21 provide electrically conductive paths between the bar ends 21, such that electrical current can be conducted through the electrically connected plurality of conductor bars 12 to form a rotor including the locked pack 10C and shorting sheets 61 shown in FIG. 13C.

The "locking force" collectively exerted on the skewed lamination stack 20 and incrementally skewed shorting rings 60 by the opposing bent bar ends 21 of the plurality of bent conductor bars 12 is sufficient to prevent both axial and radial movement of the laminations 22 in the lamination stack 20, to prevent both axial and radial movement of the shorting sheets 61 in the shorting rings 60, and to prevent both axial and radial movement of the conductor bars 12 relative to the rotation axis 13 before and after removal of the mandrel 30, the retainer 31, and the rotation elements 64 from the locked pack 10C, thus forming the locked pack 10C shown in part in FIG. 13C. In one example, the locking force exerted by the bent bar ends 21 is sufficient to achieve a predetermined minimum packing ratio of the shorting rings 60 and locked pack 10C, and to prevent axial and radial movement of the conductor bars 12, laminations 22 and shorting sheets 61, such that the locked pack 10C shown in FIG. 13C is advantaged by being resistant to high frequency vibration of the conductor bars 12 in the stack 20 during operation, for example in a motor, of a rotor formed of the lamination pack 10 including the locked pack 10C and distal and proximal shorting rings 60. The locking force exerted by the bent bar ends 21 is maintained over a useful lifetime of the lamination pack 10, thereby maintaining the density of the shorting rings 60 and stack 20 at the predetermined packing ratio over time, such that the rotor including the locked pack 10C and distal and proximal shorting rings 60 delivers consistent and relatively high power density over time and is resistant to cogging.

The example apparatus and methods disclosed herein are not intended to be limiting, and it would be understood that various alternatives for forming the lamination pack 10 and/or a rotor containing the lamination pack 10 can be used. By way of non-limiting example, at least a portion of the method for forming the lamination pack 10 may automated and/or executed with the use of robots or other automation. For example, the embodiment illustrated by FIGS. 1-8C may be executed using an automated process which includes the mandrel 14 and the first end plate 41 located in a fixture or device configured to receive the lamination stack 20. The lamination stack 20 can be manipulated after being received onto the mandrel 14 to align the lamination slots 28 to form the rotor slots 19 and to align the slots 19 with the plate slots 47, for example, using a robot or automated alignment device, such as one or more alignment fingers inserted to one or more respective rotor slots 19. The conductor bars 12 can be inserted automatically to the rotor slots 19 as the lamination stack 20 is retained in an aligned orientation on the mandrel 14 and relative to the fixture plate 41, to insert each conductor bar 12 through a respective rotor slot 19 and into a respective plate slot 47. The lamination pack 10 and/or conductor bars 12 may be vibrated by the device during insertion to ensure the conductor bars 12 are fully received into the plate slots 47.

After inserting the conductor bars 12, the second end plate 42 can be positioned on the lamination stack 20 such that the bar ends 21 extending from the lamination stack 20 are received into the plate slots 47 of the second end plate 42. The second end plate 42 may be automatically positioned on the lamination stack 20, for example, by a robot, and the retainer 31 applied to the mandrel 14 to exert the aligning force, prior to automatically rotating at least one of the first and second end plates 41, 42 to skew the lamination stack 20 and conductor bars 12 to the skew angle, to form the skewed pack 10B. The retainer 31 may be automatically adjusted to increase the compressive force exerted on the skewed pack 10B from the aligning force to a retaining force, prior to automatically rotating at least one of the first and second end plates 41, 42 to bend the bar ends 21 to the bend angle, to lock the conductor bars 12 to the lamination stack 20 and form the locked pack 10C. The retaining force is released from the locked pack 10C, for example, by removal of the retainer 31, and the mandrel 14 and end plates 41, 42 automatically removed from the locked pack 10C. The locked pack 10C may be automatically, e.g., robotically, transferred to a subsequent operation to form electrical connections between the bent bar ends 21. For example, the locked pack 10C can be robotically inserted into a casting die for casting of cast end rings to electrically connect the bent bar ends 21. Likewise, the embodiment illustrated by FIGS. 9-13C may be executed using a process which is at least partially automated and/or robotized.

While the best modes for carrying out the disclosure have been described in detail, those familiar with the art to which this disclosure relates will recognize various alternative designs and embodiments for practicing the disclosure within the scope of the appended claims.

The invention claimed is:

1. A method of skewing a lamination stack such that at least one conductor bar is skewed relative to a longitudinal axis by a skew angle, the method comprising:
bending a first end of the at least one conductor bar in a first radial direction to a bend angle relative to an intermediate portion of the conductor bar; and
bending a second end of the at least one conductor bar in a second radial direction to the bend angle relative to the intermediate portion of the conductor bar, wherein the first radial direction opposes the second radial direction.

2. The method of claim 1, further comprising:
exerting a retaining force on the lamination stack to compress the lamination stack to a predetermined packing ratio.

3. The method of claim 1, wherein the lamination stack comprises a plurality of laminations, the method further comprising:
exerting a retaining force on the lamination stack to prevent axial movement and prevent radial rotation of each lamination relative to each other lamination.

4. The method of claim 3, wherein the retaining force is exerted on the lamination stack after skewing the lamination stack and is maintained during bending of the first and second ends.

5. The method of claim 3, further comprising:
positioning the lamination stack with the at least one conductor bar skewed relative to the longitudinal axis on a mandrel;
attaching an adjustable retainer to the mandrel; and
adjusting the retainer to exert the retaining force on the skewed lamination stack.

6. The method of claim 1, wherein the lamination stack comprises a plurality of laminations; and
wherein the first and second ends exert a locking force on the lamination stack such that axial and radial movement of each lamination relative to each other lamination of the plurality of laminations is prevented.

7. The method of claim 1, wherein the first and second ends are bent concurrently.

8. The method of claim 1, further comprising:
positioning a first rotation plate defining a plurality of plate slots adjacent a proximal face of the lamination stack, such that the first end of the at least one conductor bar is received into a respective one of the plate slots of the first rotation plate;
positioning a second rotation plate defining a plurality of plate slots adjacent a distal face of the lamination stack, such that the second end of the at least one conductor bar is received into a respective one of the plate slots of the second rotation plate;
wherein skewing the lamination stack includes rotating at least one of the first and second rotation plates by a first amount to exert a skewing force on the first and second ends via the interface between the first and second bar ends and the plate slots;
wherein bending the first and second ends includes rotating at least one of the first and second rotation plates by a second amount to exert a bending force on the first and second ends; and
wherein the second amount of rotation is incremental to the first amount of rotation.

9. The method of claim 8, wherein each of the first and second rotation plates comprises a plurality of shorting sheets.

10. The method of claim 9, wherein after bending, the first and second ends exert a locking force on the shorting sheets such that axial and radial movement of each shorting sheet relative to each other shorting sheet of the plurality of shorting sheets is prevented.

11. A lamination pack comprising:
a lamination stack defining a longitudinal axis;
at least one conductor bar including first and second ends and an intermediate portion which is intermediate the first and second ends;
wherein:
the intermediate portion of the conductor bar is skewed relative to the longitudinal axis;
the first end is bent in a first radial direction relative to the intermediate portion of the at least one conductor bar;
the second end is bent in a second radial direction relative to the intermediate portion of the at least one conductor bar; and
the first radial direction opposes the second radial direction.

12. The lamination pack of claim 11, wherein:
the lamination stack comprises a plurality of laminations; and
the first and second ends exert a locking force on the lamination stack such that axial and radial movement of each lamination relative to each other lamination of the plurality of laminations is prevented.

13. The lamination pack of claim 11, further comprising:
a proximal end ring disposed adjacent a proximal face of the lamination stack;
a distal end ring disposed adjacent a distal face of the lamination stack;
wherein:
the first end is electrically connected to the proximal end ring; and
the second end is electrically connected to the distal end ring.

14. The lamination pack of claim 11, further comprising:
a proximal end ring disposed adjacent a proximal face of the lamination stack;
a distal end ring disposed adjacent a distal face of the lamination stack;
wherein:
the first bent end is disposed in a ring slot defined by the proximal end ring; and
the second bent end is disposed in a ring slot defined by the distal end ring.

15. The lamination pack of claim 11, wherein:
the intermediate portion of the conductor bar is skewed to a skew angle relative to the longitudinal axis;
the bar end is bent to a locking angle relative to the longitudinal axis; and
the locking angle is greater than the skew angle.

16. The lamination pack of claim 15, further comprising:
a shorting ring disposed adjacent each of a proximal and a distal face of the lamination stack;
wherein:

the shorting ring comprises a plurality of shorting sheets skewed relative to the longitudinal axis by the locking angle to define a ring slot;

the first bent end is disposed in the ring slot defined by the shorting ring disposed adjacent the proximal face; and the second bent end is disposed in the ring slot defined by the shorting ring disposed adjacent the distal face.

17. The lamination pack of claim 16, wherein:
the first and second bent ends exert a locking force on the shorting rings such that axial and radial movement of each shorting sheet relative to each other shorting sheet is prevented.

18. A method comprising:
receiving a lamination stack having a longitudinal axis and a plurality of conductor bars onto a mandrel;

positioning a first shorting ring defining a plurality of ring slots adjacent a proximal face of the lamination stack, such that a first end of each of the plurality of conductor bars is received into a respective one of the ring slots of the first shorting ring;

positioning a second shorting ring defining a plurality of ring slots adjacent a distal face of the lamination stack, such that a second end of each of the plurality of conductor bars is received into a respective one of the ring slots of the second shorting ring; and skewing the first and second shorting rings in opposing radial directions to a skew angle relative to the longitudinal axis such that each of the plurality of conductor bars is skewed relative to the longitudinal axis by the skew angle.

19. The method of claim 18, wherein the lamination stack comprises a plurality of laminations, the method further comprising:

attaching an adjustable retainer to the mandrel to retain the lamination stack on the mandrel;

adjusting the retainer to exert a retaining force on the lamination stack such that axial movement and radial rotation of each lamination relative to each other lamination is prevented; and incrementally skewing the first and second shorting rings in opposing radial directions to a locking angle relative to the longitudinal axis such that the first and second ends are bent in opposing radial directions to a locking angle relative to the longitudinal axis.

20. The method of claim 19, wherein the bent first and second ends exert a locking force on the lamination stack such that axial and radial movement of each lamination relative to each other lamination of the plurality of laminations is prevented.

* * * * *